US007895366B2

(12) United States Patent  (10) Patent No.: US 7,895,366 B2
Hibi  (45) Date of Patent: Feb. 22, 2011

(54) INFORMATION TRANSMISSION DEVICE AND INFORMATION TRANSMISSION METHOD

(75) Inventor: Michio Hibi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 632 days.

(21) Appl. No.: 11/856,972

(22) Filed: Sep. 18, 2007

(65) Prior Publication Data
US 2008/0022022 A1  Jan. 24, 2008

Related U.S. Application Data

(63) Continuation of application No. PCT/JP2005/005131, filed on Mar. 22, 2005.

(51) Int. Cl.
G06F 13/38 (2006.01)
G06F 11/00 (2006.01)

(52) U.S. Cl. .............................. 710/8; 710/60; 710/104; 710/105; 710/106; 714/708

(58) Field of Classification Search ........................ None
See application file for complete search history.

(56) References Cited

U.S. PATENT DOCUMENTS

| 4,890,316 | A | 12/1989 | Walsh et al. ................. 379/98 |
| 6,167,034 | A * | 12/2000 | Langberg et al. ............ 370/281 |
| 7,020,711 | B2 | 3/2006 | Rupp et al. |
| 7,302,186 | B2 * | 11/2007 | Light et al. ................. 398/137 |
| 2002/0091838 | A1 | 7/2002 | Rupp et al. ................. 709/227 |
| 2002/0196736 | A1 | 12/2002 | Jin ............................ 370/229 |
| 2003/0007504 | A1 * | 1/2003 | Berry et al. ................. 370/465 |
| 2003/0193999 | A1 | 10/2003 | Iinuma ....................... 375/222 |
| 2004/0147281 | A1 * | 7/2004 | Holcombe et al. ........ 455/550.1 |
| 2004/0243666 | A1 | 12/2004 | Wood ......................... 709/202 |

FOREIGN PATENT DOCUMENTS

DE  199 39 568  2/2001
JP  2003-507966  2/2003

(Continued)

OTHER PUBLICATIONS

Office Action dated May 30, 2008 in corresponding European Patent Application No. 05727081.1 (3 pages).

(Continued)

Primary Examiner—Ilwoo Park
(74) Attorney, Agent, or Firm—Staas & Halsey LLP

(57) ABSTRACT

An information transmission device that is included in components and carries out communication between the components in an information processing device including a control monitoring unit that controls and monitors the components, comprising: a transmission control unit that stores a transmission parameter; a transmission unit that has transmission data input thereto in a first transmission speed or a second transmission speed having a transmission speed lower than the first transmission speed, adjusts the transmission data according to the transmission parameter, and sends the transmission data as a transmission signal to the information transmission device which is a connection destination; a receive control unit that stores a receive parameter; and a receiving unit that adjusts a receive signal received from the information transmission device which is a connection destination in accordance with the receive parameter, and outputs the receive signal in the first transmission speed or the second transmission speed as the receive data.

8 Claims, 11 Drawing Sheets

FOREIGN PATENT DOCUMENTS

| | | |
|---|---|---|
| JP | 2003-101608 | 4/2003 |
| JP | 2003-288320 | 10/2003 |
| JP | 2003-298603 | 10/2003 |
| JP | 2004-534314 | 11/2004 |

OTHER PUBLICATIONS

International Search Report dated Jul. 5, 2005 in corresponding PCT Application No. PCT/JP2005/005131.

International Preliminary Report on Patentability, mailed Sep. 25, 2007, in corresponding International Application No. PCT/JP2005/005131 (5 pp.).

Office Action dated Sep. 19, 2008 in corresponding Japanese Patent Application No. 200580046599.1 (8 pp including translation).

Office Action, mailed Mar. 23, 2010, in corresponding Japanese Application No. 2007-509108 (3 pp.).

* cited by examiner

INFORMATION TRANSMISSION DEVICE AND INFORMATION TRANSMISSION METHOD

This application is a continuing application, filed under 35 U.S.C. §111(a), of International Application PCT/JP2005/005131, filed Mar. 22, 2005.

TECHNICAL FIELD

The present invention relates to an information transmission device and information transmission method for carrying out high-speed transmission between components and carrying out control monitoring of the components.

BACKGROUND ART

An information processing device such as a server device and a storage device includes a control monitoring board, and the control monitoring board controls and monitors each board which is a component of the information processing device. For this reason, the control monitoring board and other boards have a control monitoring interface, are connected with a transmission path for an exclusive use, and carry out communication for control monitoring. In addition, along with the information processing device having higher performance and higher speed, a data transmission speed in the information processing device and between the information processing devices has increasingly higher speed. In the information processing device described above, a multi-gigabit transmission system which is high-speed data transmission exceeding 1 Gbps has been used in addition to the communication for the control monitoring.

Here, a configuration of an information processing device using a conventional multi-gigabit transmission system will be explained. FIG. 10 is a block diagram showing an example of the configuration of the conventional information processing device. This information processing device includes a control monitoring transmission path 11, a multi-gigabit transmission path 12, a control monitoring board 131, a crossbar switch board 132, a CPU (Central Processing Unit) board 133, an IO (input/output) control board 134, an SCSI (Small Computer System Interface) control board 135, a LAN (Local Area Network) control board 136, and a USB (Universal Serial Bus) control board 137.

The control monitoring board 131 carries out control monitoring of the crossbar switch board 132, the CPU board 133, the IO control board 134, the SCSI control board 135, the LAN control board 136, and the USB control board 137, which are boards of other components of the information processing device. For this reason, the control monitoring board 131 includes a control monitoring interface 13, each board includes the control monitoring interface 13, and the control monitoring interfaces 13 are connected to each other by the control monitoring transmission path 11. Further, each board includes a multi-gigabit transmission interface 138 for carrying out multi-gigabit transmission with other boards. The multi-gigabit transmission interfaces 138 are connected to each other with the multi-gigabit transmission path 12.

Next, a configuration of the conventional multi-gigabit transmission system is will be described. FIG. 11 is a block diagram showing an example of the configuration of the conventional multi-gigabit transmission system. The multi-gigabit transmission system includes a backplane 21, a BP (backplane) connector 22, boards 139a and 139b which are any of the components of the information processing device. The boards 139a and 139b include multi-gigabit transmission interfaces 138a and 138b, respectively. The multi-gigabit transmission interfaces 138a and 138b correspond to the multi-gigabit transmission interface 138 described above. In addition, the backplane 21 and the BP connector 22 are components of the multi-gigabit transmission path 12, and wiring length of the backplane 21 and the BP connector 22 is different depending on a mounting slot of each of the board.

Transmission data from the board 139a is sent from the multi-gigabit transmission interface 138a, is received at the multi-gigabit transmission interface 138b via the multi-gigabit transmission path 12, and then is output to the board 139b as received data. In a similar manner, transmission data from the board 139b is sent from the multi-gigabit transmission interface 138b, is received at the multi-gigabit transmission interface 138a via the multi-gigabit transmission path 12, and then is output to the board 139a as received data.

FIG. 12 is a block diagram showing an example of a configuration of a conventional multi-gigabit transmission interface. The multi-gigabit transmission interface 138 includes a transmission unit 41, a transmission parameter storage unit 42, a transmission parameter control unit 143, a receiving unit 51, a receive parameter storage unit 52, a receive parameter control unit 153. The transmission parameter control unit 143 sets a transmission parameter in the transmission parameter storage unit 42. The transmission unit 41 adjusts a waveform of transmission data input from the board in accordance with the transmission parameter in the transmission parameter storage unit 42, and sends the waveform to the multi-gigabit transmission path 12. The receive parameter control unit 153 sets a receive parameter in the receive parameter storage unit 52. The receiving unit 51 adjusts the waveform received from the multi-gigabit transmission path 12 in accordance with the receive parameter in the receive parameter storage unit 52, and outputs the waveform to the board as receive data.

DISCLOSURE OF THE INVENTION

Problems to be Solved by the Invention

As described above, in order to ensure communication at a low transmission speed, the control monitoring by the control monitoring board 131 needs the control monitoring transmission path 11 and the control monitoring interface 13 on each of the boards. In addition, the control monitoring transmission path 11 uses an IIC, a USB, and so on, and the control monitoring interface 13 needs an LSI for exclusive use and has a problem that wiring is congested.

In addition, in order to guarantee transmission at a high-speed, a waveform of transmission in an actual device needs to be observed to check an amplitude waveform and a jitter margin. In particular, in the multi-gigabit transmission system, wiring of an LSI (Large Scale Integrated Circuit) package, and a circuit and wiring of a protective circuit and so on of an LSI chip significantly affect a receive waveform. However, a waveform which can be observed from outside the LSI package by using an IO pin of the LSI is different from the receive waveform at an inputting point of the receiving circuit in the LSI package. Therefore, in order to appropriately evaluate and determine the amplitude and the jitter margin, a large number of man-hours are necessary. In addition, in evaluation in the actual device, contacting a probe directly to the LSI chip after opening the LSI package is difficult and unrealistic.

In addition, in the multi-gigabit transmission system used in the information processing device, the transmission unit and the receiving unit need to be tuned in order to correspond to a variety of transmission paths using the backplane and a cable. In order to achieve this, an output amplitude, emphasis strength, a driving impedance, selection of AC/DC coupling, signal speed, and so on which are the transmission parameters used by the transmission unit 41, and equalizer setting, a gain, and so on which are the receive parameters used by the receiving unit 51 need to be set to appropriate values each time a condition of the transmission path changes. Further, depending on the mounting slot of each of the boards and a destination to which the cable is connected in the backplane, the appropriate setting value of each of the parameters is different. In addition, depending on variation of characteristics of parts, and a characteristic change depending on temperature and a power source, the appropriate setting value of each of the parameters is different.

For the above reason, the mounting slot and the cable length have been fixed. In addition, the setting value of each parameter has been determined for each of the mounting slots and the cable length, and the setting has been carried out by firmware and a driver at the time of turning on power and resetting the device. In these measures, degree of freedom in a device configuration becomes lower and a tolerable range with respect to a variation of characteristics of parts becomes narrow, therefore a large number of man-hours has been necessary in order to determine the setting value. For example, when the boards having an identical function are mounted in the different mounting slots, a condition of the transmission path is different depending on a difference between the mounting slots. Therefore, man-hours for optimizing parameters of transmission equipment and receiving equipment have been necessary at each time of mounting.

The present invention is made to solve the problem described above. An object of the present invention is to provide the information transmission device and the information transmission method, in which the control monitoring transmission system and the multi-gigabit transmission system are achieved with common hardware, and optimization of the multi-gigabit transmission system is facilitated.

Means for Solving the Problem

In order to achieve the object described above, according to the present invention, there is provided an information transmission device that is included in components and carries out communication between the components in an information processing device including a control monitoring unit that controls and monitors the components, comprising: a transmission control unit that stores a transmission parameter; a transmission unit that has transmission data input thereto in a first transmission speed or a second transmission speed having a transmission speed lower than the first transmission speed, adjusts the transmission data according to the transmission parameter, and sends the transmission data as a transmission signal to the information transmission device which is a connection destination; a receive control unit that stores a receive parameter; and a receiving unit that adjusts a receive signal received from the information transmission device which is a connection destination in accordance with the receive parameter, and outputs the receive signal in the first transmission speed or the second transmission speed as the receive data.

In the information transmission device according to the present invention, the transmission unit and the receiving unit use the second transmission speed with respect to data of the control and the monitoring.

In the information transmission device according to the present invention, the transmission unit and the receiving unit carry out communication in the second transmission speed first, and after the communication is terminated, the transmission unit and the receiving unit carry out communication in the first transmission speed, in a case where any of turning on of power, resetting, and activation is carried out in the component including the information transmission device.

In the information transmission device according to the present invention, the transmission unit modulates the transmission data in the second transmission speed by a pattern of the first transmission speed when the transmission data in the second transmission speed is input, and sends the modulated transmission data as a transmission signal; and the receiving unit demodulates the receive signal in the second transmission speed modulated by the pattern of the first transmission speed, and outputs receive data in the second transmission speed.

In the information transmission device according to the present invention, the transmission parameter includes any of an output amplitude, emphasis strength, a driving impedance, selection of AC/DC coupling, and a transmission speed; and the receive parameter includes any of an equalizer coefficient and a gain.

In the information transmission device according to the present invention, the transmission unit sends a test pattern to the information transmission device which is a connection destination in the first transmission speed, and when the information transmission device which is a connection destination receives the test pattern, an error ratio of the test pattern is measured, and the information transmission device sends a measurement result of the error ratio in the second transmission speed, the receiving unit receives the measurement result of the error ratio, and the transmission control unit changes the transmission parameter based on the measurement result of the error ratio.

In the information transmission device according to the present invention, the receiving unit receives a test pattern sent by the information transmission device which is a connection destination in the first transmission speed, and measures an error ratio of the received test pattern, the receive control unit changes the receive parameter based on a measurement result of the error ratio, and the transmission unit sends the measurement result of the error ratio to the information transmission device which is a connection destination in the second transmission speed.

According to the present invention, there is provided an information transmission method that carries out communication between components in an information processing device including a control monitoring unit that controls and monitors the components, comprising: a transmission control step that stores a transmission parameter; a transmission step that has transmission data input thereto in a first transmission speed or a second transmission speed having a transmission speed lower than the first transmission speed, adjusts the transmission data according to the transmission parameter, and sends the transmission data as a transmission signal to the component which is a connection destination; a receiving control step that stores a receive parameter; and a receiving step that adjusts a receive signal received from the component which is a connection destination in accordance with the receive parameter, and outputs the receive signal in the first transmission speed or the second transmission speed as the receive data.

In the information transmission method according to the present invention, the transmission step and the receiving step use the second transmission speed with respect to data of the control and the monitoring.

In the information transmission method according to the present invention, the transmission step and the receiving step carry out communication in the second transmission speed first, and after the communication is terminated, the transmission step and the receiving step carry out communication in the first transmission speed, in a case where any of turning on of power, resetting, and activation is carried out in the component.

In the information transmission method according to the present invention, the transmission step modulates the transmission data in the second transmission speed by a pattern of the first transmission speed when the transmission data in the second transmission speed is input, and sends the modulated transmission data as a transmission signal; and the receiving step demodulates the receive signal in the second transmission speed modulated by the pattern of the first transmission speed, and outputs receive data in the second transmission speed.

In the information transmission method according to the present invention, the transmission parameter includes any of an output amplitude, emphasis strength, a driving impedance, selection of AC/DC coupling, and a transmission speed; and the receive parameter includes any of an equalizer coefficient and a gain.

In the information transmission method according to the present invention, the transmission step sends a test pattern to the component which is a connection destination in the first transmission speed, and when the component which is a connection destination receives the test pattern, an error ratio of the test pattern is measured, and a measurement result of the error ratio is transmitted in the second transmission speed, the receiving step receives the measurement result of the error ratio, and the transmission control step changes the transmission parameter based on the measurement result of the error ratio.

In the information transmission method according to the present invention, the receiving step receives a test pattern sent by the component which is a connection destination in the first transmission speed, and measures an error ratio of the received test pattern, the receiving control step changes the receive parameter based on a measurement result of the error ratio, and the transmission step sends the measurement result of the error ratio to the component which is a connection destination in the second transmission speed.

BEST MODE FOR CARRYING OUT THE INVENTION

Hereinafter, an embodiment of the present invention will be described with reference to the accompanying drawings.

An information processing device according to the present invention uses a high-speed transmission mode in which optimization of a transmission parameter and a receive parameter is necessary by using multi-gigabit transmission and a low-speed transmission mode in which the optimization of the transmission parameter and the receive parameter is not necessary by using a transmission speed lower than the multi-gigabit transmission in a switching manner in a multi-gigabit transmission interface and a multi-gigabit transmission path. Further by carrying out control monitoring in the low-speed transmission mode, the number of control monitoring interfaces and control monitoring transmission paths are reduced.

First, a configuration of the information processing device according to the present invention will be described.

Figure 1:
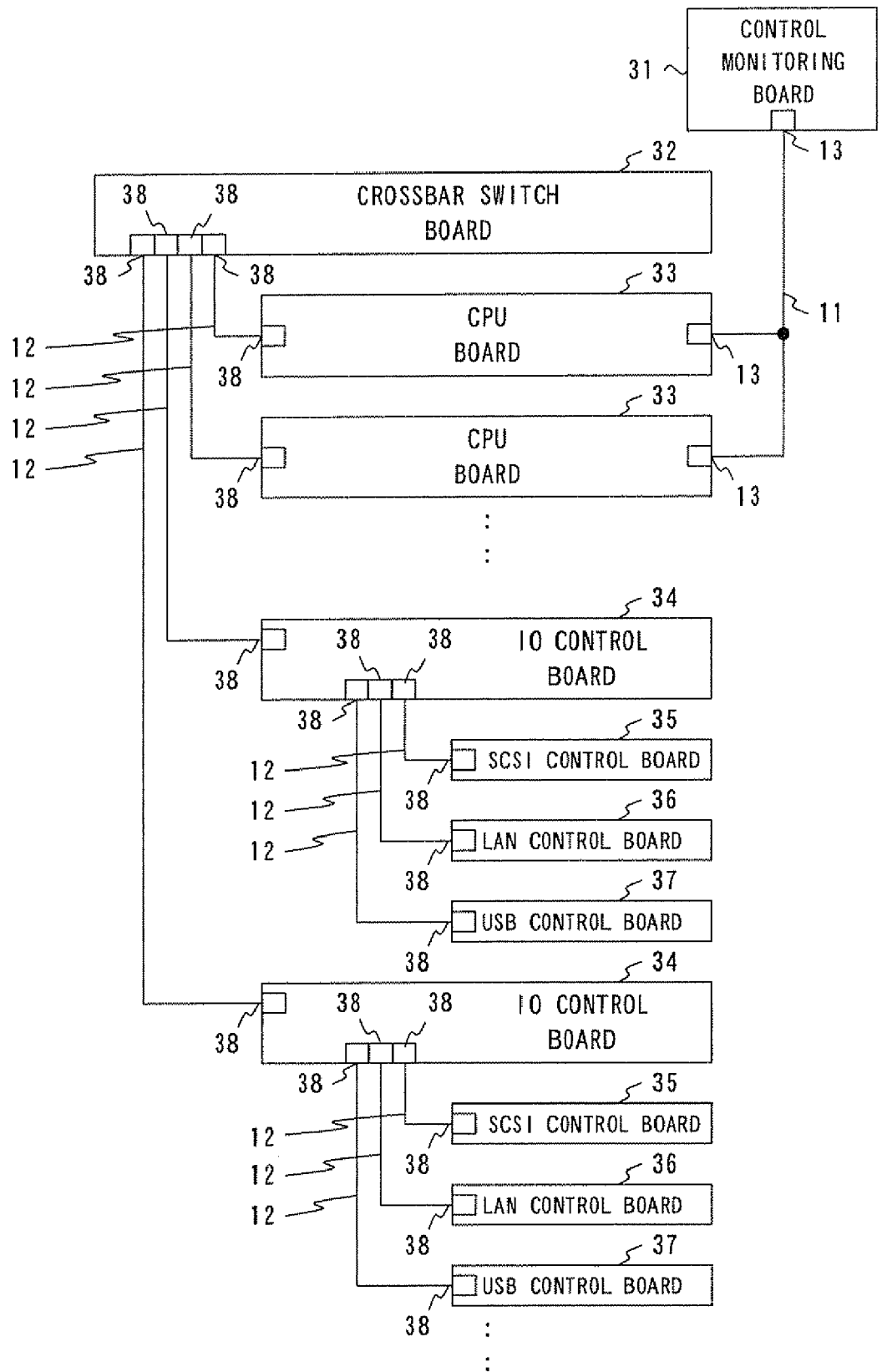
FIG. 1 is a block diagram showing an example of a configuration of an information processing device according to the present invention.
Figure 10:
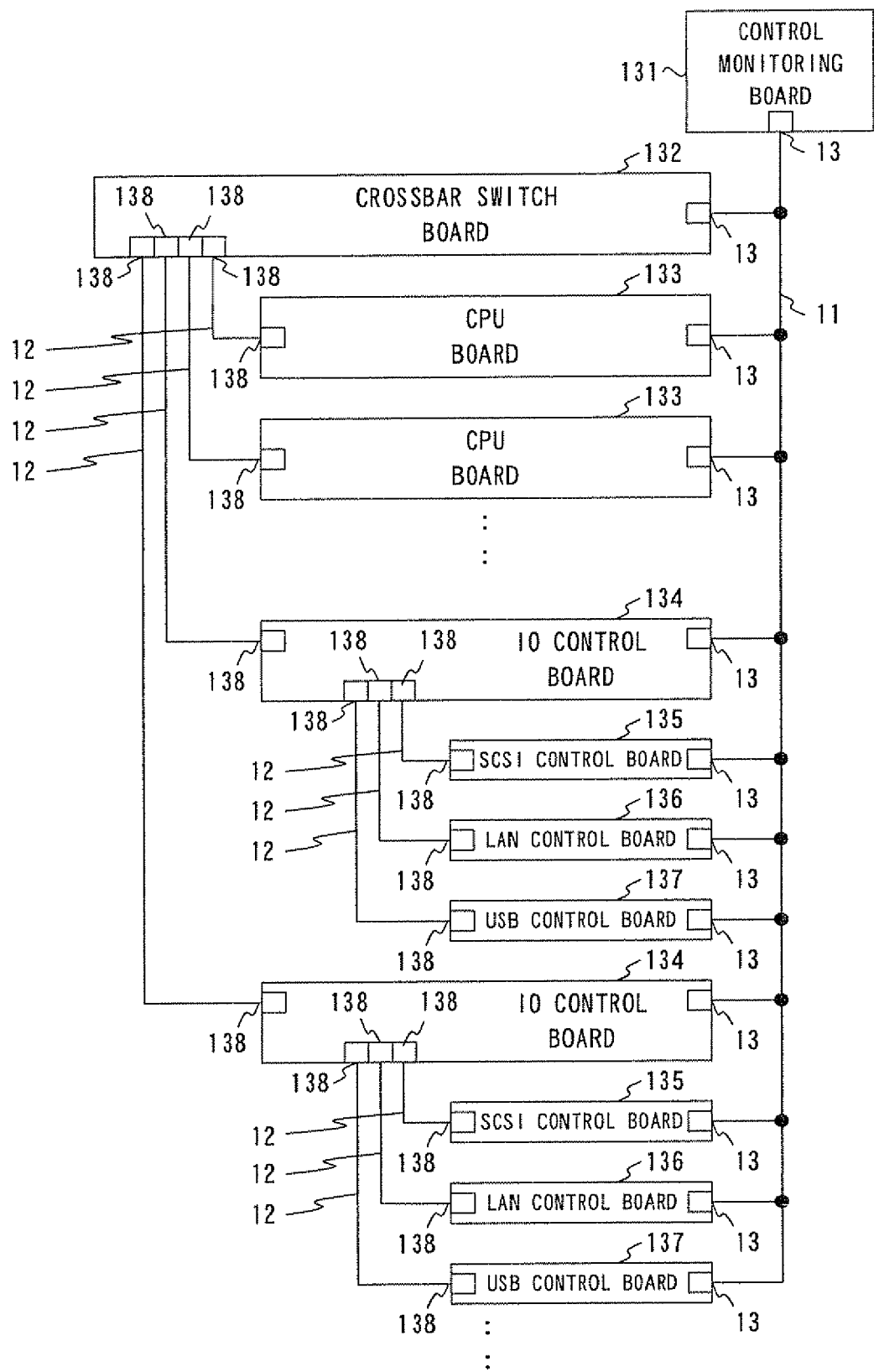
FIG. 10 is a block diagram showing an example of a configuration of a conventional information processing device.

FIG. 1 is a block diagram showing an example of the configuration of the information processing device according to the present invention. In FIG. 1, reference numerals identical with those in FIG. 10 denote portions same or equivalent to those shown in FIG. 10, and description thereof is omitted here. As compared with FIG. 10, FIG. 1 includes a control monitoring board 31 in place of a control monitoring board 131, a crossbar switch board 32 in place of a crossbar switch board 132, a CPU board 33 in place of a CPU board 133, an IO control board 34 in place of an IO control board 134, an SCSI control unit 35 in place of an SCSI control unit 135, a LAN control board 36 in place of a LAN control board 136, a USB control board 37 in place of a USB control board 137, and a multi-gigabit transmission interface 38 in place of a multi-gigabit transmission interface 138.

In the information processing device according to the present invention, the CPU board 33 and the control monitoring board 31 are connected by a control monitoring interface 13 and a control monitoring transmission path 11 as similar to a conventional art. However, each of the other boards, which are the crossbar switch board 32, the IO control board 34, the SCSI control board 35, the LAN control board 36, and the USB control board 37, and the control monitoring board 31 do not need the control monitoring transmission path 11 and the control monitoring interface 13 therebetween. Therefore, a large number of the control monitoring transmission paths 11 and the control monitoring interfaces 13 can be reduced.

Next, a configuration of the multi-gigabit transmission system according to the present invention will be described.

Figure 2:
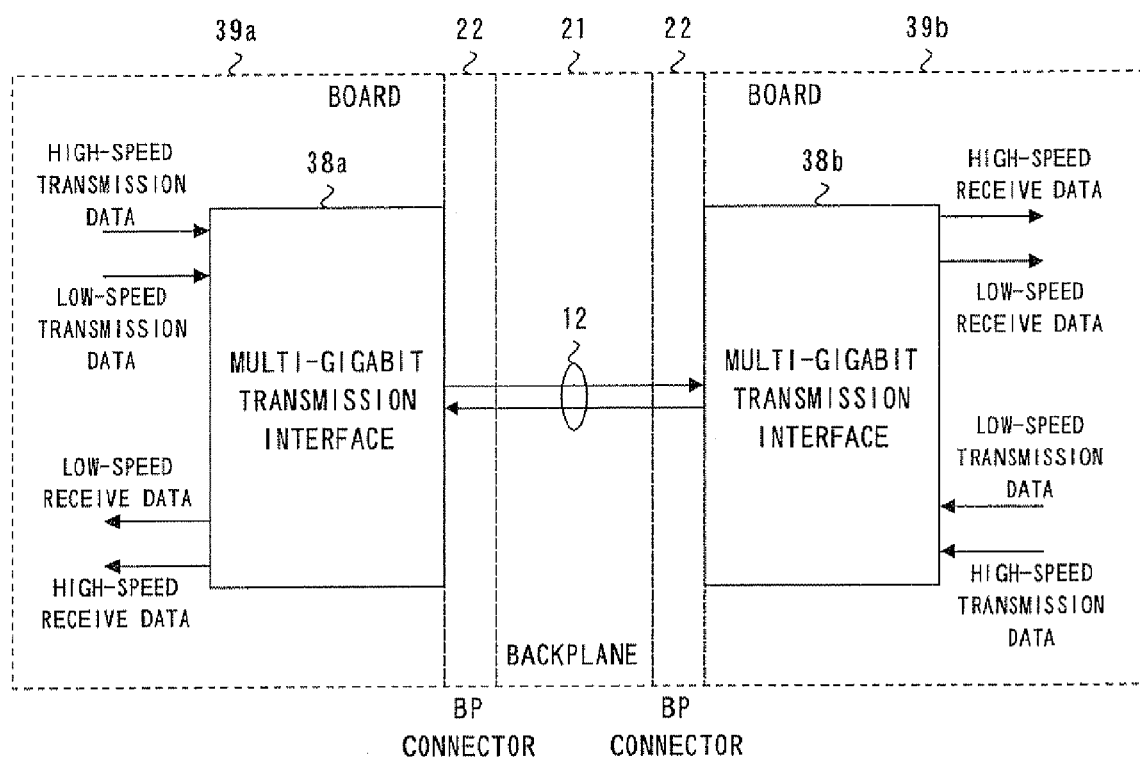
FIG. 2 is a block diagram showing an example of a configuration of a multi-gigabit transmission system according to the present invention.
Figure 11:
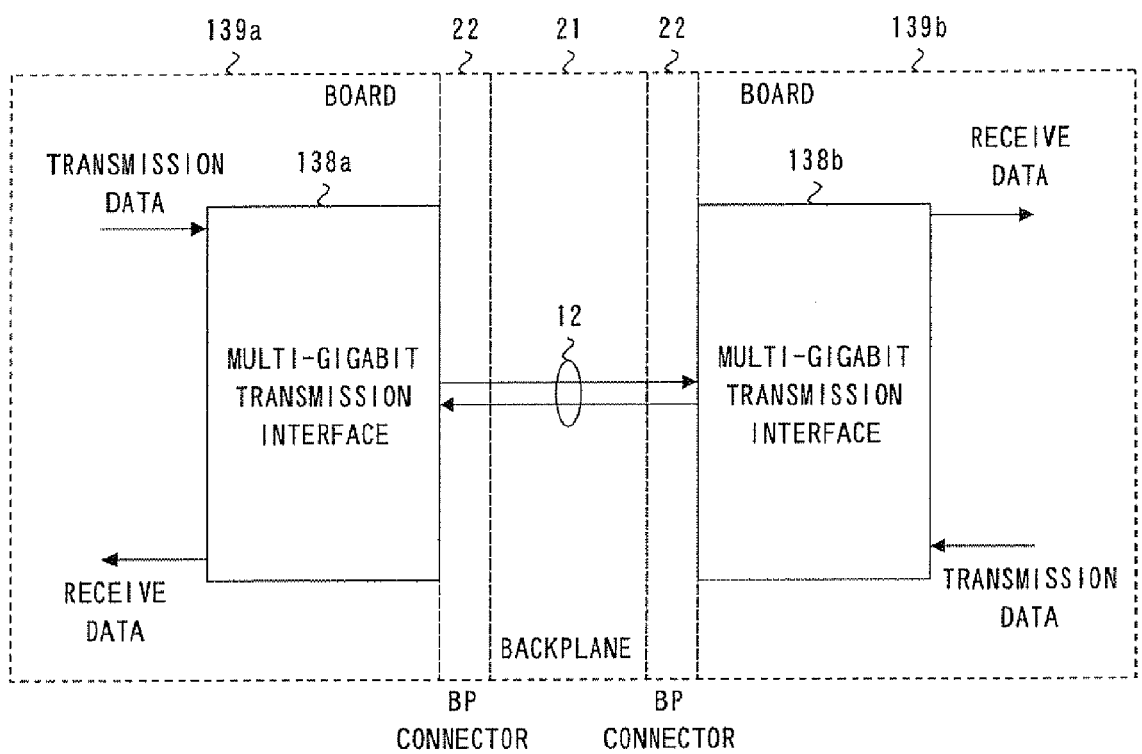
FIG. 11 is a block diagram showing an example of a configuration of a conventional multi-gigabit transmission system.

FIG. 2 is a block diagram showing an example of the configuration of the multi-gigabit transmission system according to the present invention. In FIG. 2, reference numerals identical with those in FIG. 11 denote portions same or equivalent to those shown in FIG. 11, and description thereof is omitted here. As compared with FIG. 11, FIG. 2 includes boards 39a and 39b in place of boards 139a and 139b. In addition, the boards 39a and 39b include multi-gigabit transmission interfaces 38a and 38b in place of multi-gigabit transmission interfaces 138a and 138b, respectively. The multi-gigabit transmission interfaces 38a and 38b correspond to the multi-gigabit transmission interface 38 described above. One of the multi-gigabit transmission interfaces 38a and 38b works as a host side and the other works as an IO side to carry out communication.

High-speed transmission data which is transmission data of the high-speed transmission mode in the board 39a is sent from the multi-gigabit transmission interface 38a, received at the multi-gigabit transmission interface 38b via the multi-gigabit transmission path 12, and then output to the board 39b as high-speed receive data which is receive data of the high-speed transmission mode. In a similar manner, the high-speed transmission data which is transmission data of the high-speed transmission mode in the board 39b is sent from the multi-gigabit transmission interface 38b, received at the multi-gigabit transmission interface 38a via the multi-gigabit transmission path 12, and then output to the board 39a as the high-speed receive data which is receive data of the high-speed transmission mode.

In addition, low-speed transmission data which is transmission data of the low-speed transmission mode in the board 39a is sent from the multi-gigabit transmission interface 38a, received at the multi-gigabit transmission interface 38b via the multi-gigabit transmission path 12, and then output to the board 39b as low-speed receive data which is receive data of the low-speed transmission mode. In a similar manner, the low-speed transmission data which is transmission data of the low-speed transmission mode in the board 39b is sent from the multi-gigabit transmission interface 38b, received at the multi-gigabit transmission interface 38a via the multi-gigabit transmission path 12, and then output to the board 39a as the low-speed receive data which is receive data of the low-speed transmission mode.

Figure 3:
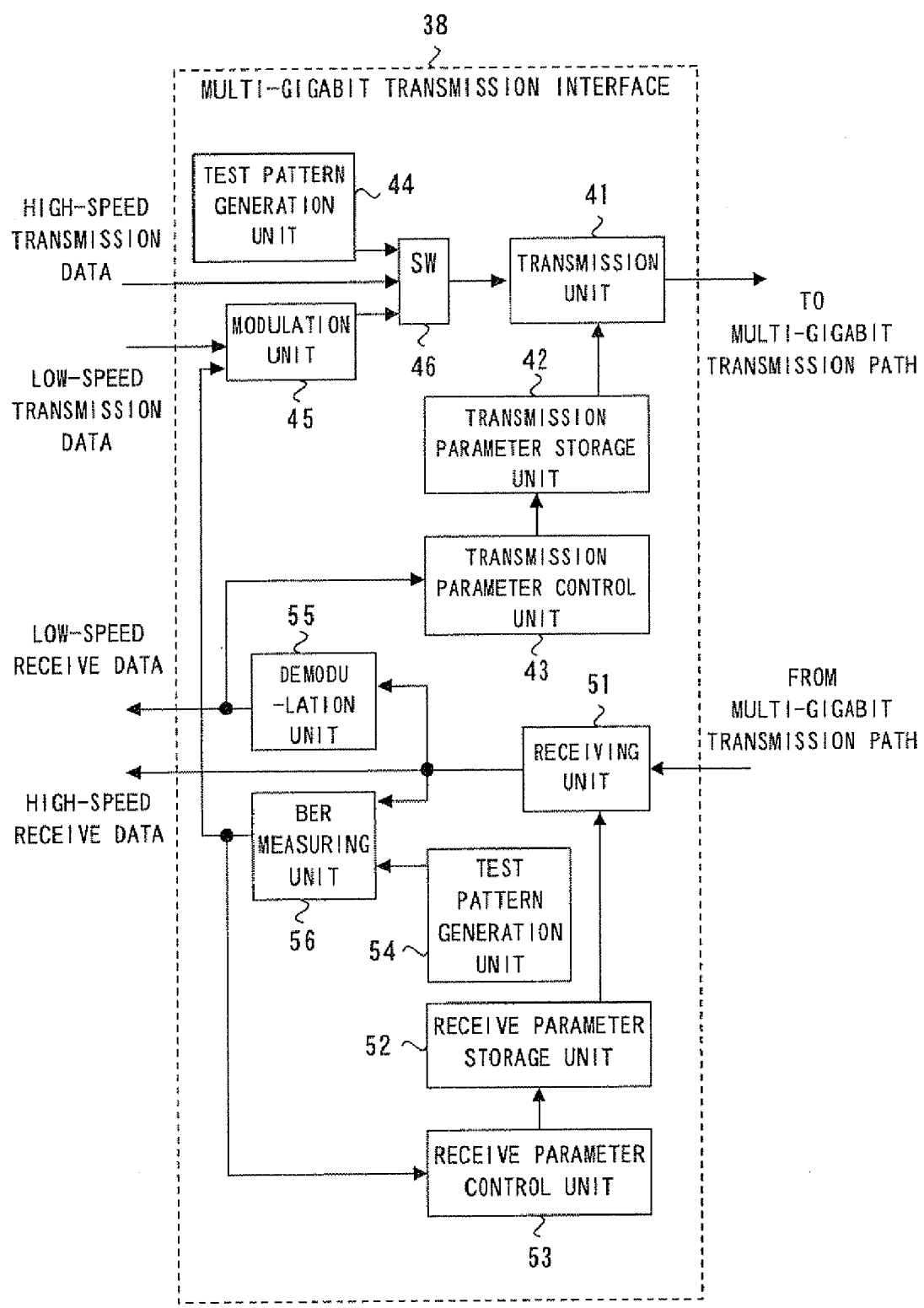
FIG. 3 is a block diagram showing an example of a configuration of a multi-gigabit transmission interface according to the present invention.
Figure 12:
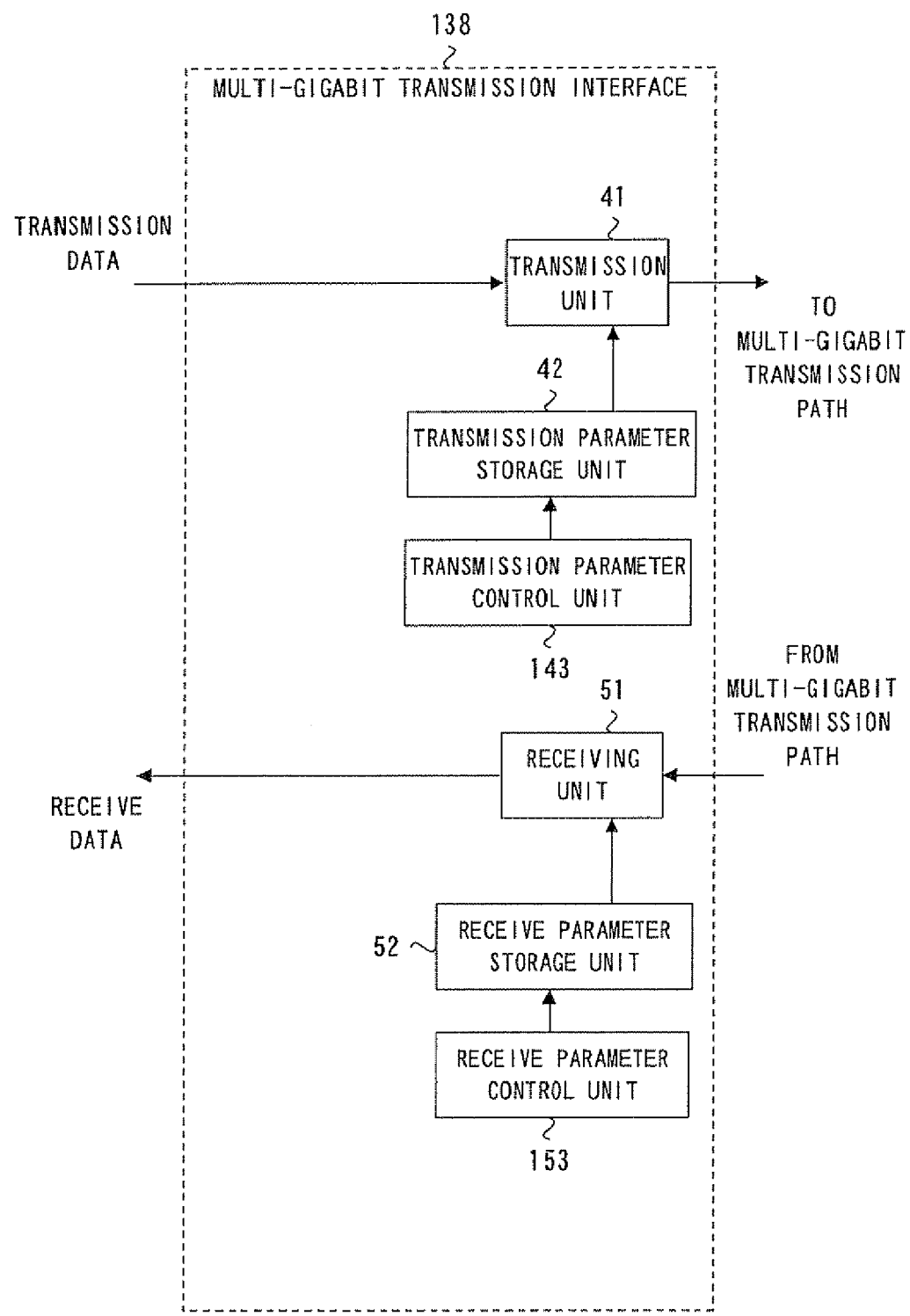
FIG. 12 is a block diagram showing an example of a configuration of a conventional multi-gigabit transmission interface.

FIG. 3 is a block diagram showing an example of a configuration of the multi-gigabit transmission interface according to the present invention. In FIG. 3, reference numerals identical with those in FIG. 12 denote portions same or equivalent to those shown in FIG. 12, and description thereof is omitted here. As compared with the multi-gigabit transmission interface 138, the multi-gigabit transmission interface 38 includes a transmission parameter control unit 43 in place of a transmission parameter control unit 143, and a receive parameter control unit 53 in place of a receive parameter control unit 153, and newly includes a test pattern generation unit 44, a modulation unit 45, an SW (switch) 46, a test pattern generation unit 54, a demodulation unit 55, and a BER (Bit Error Rate) measuring unit 56.

Next, operation of the multi-gigabit transmission interface according to the present invention will be described.

Figure 4:
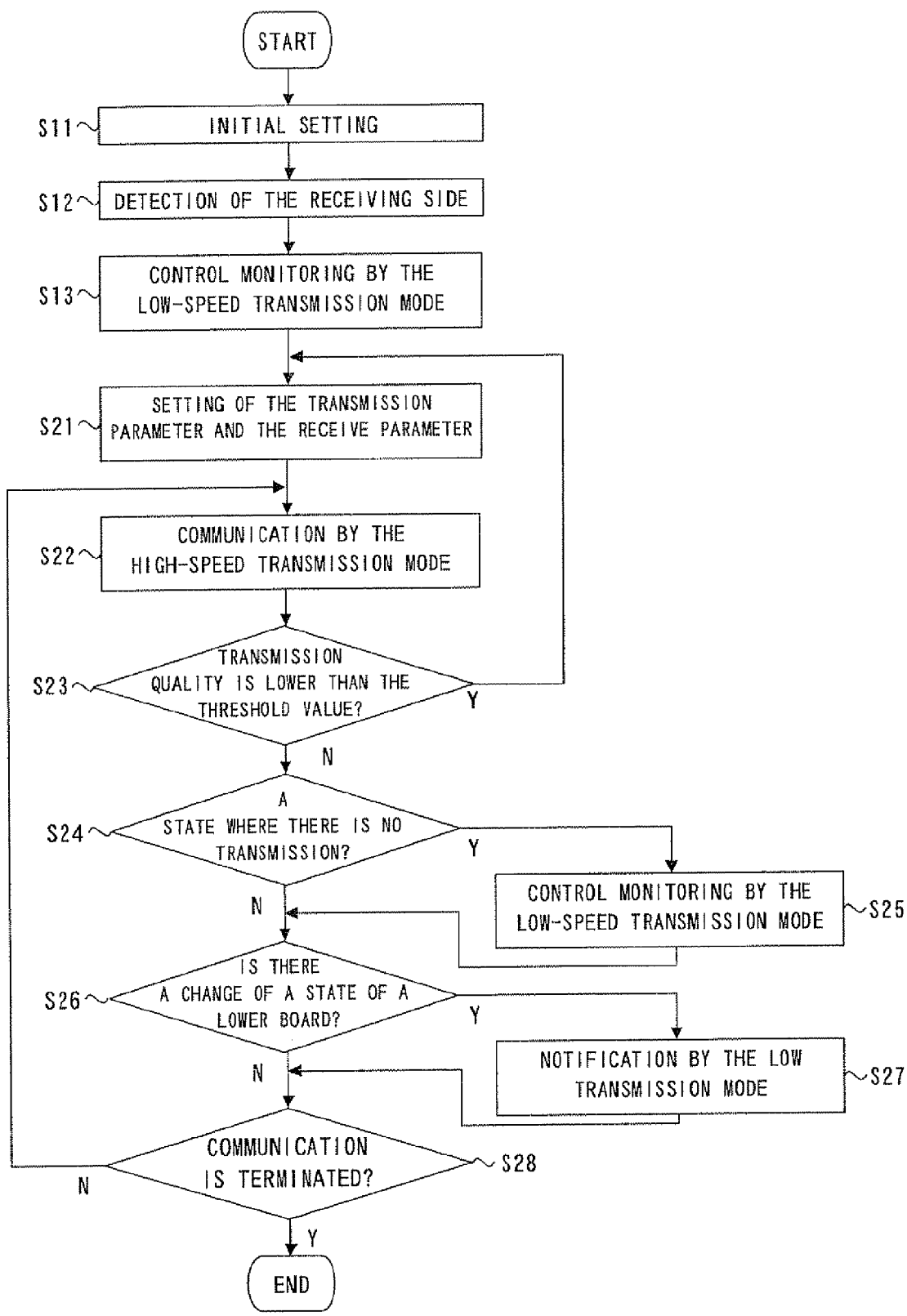
FIG. 4 is a flowchart showing an example of operation of the multi-gigabit transmission interface according to the present invention.

FIG. 4 is a flowchart showing an example of the operation of the multi-gigabit transmission interface according to the present invention. This flow shows operation of the multi-gigabit transmission interface 38a, and operation for carrying out communication in the high-speed transmission mode in the multi-gigabit transmission interface 38a and the multi-gigabit transmission interface 38b. In addition, this flow is started by any of turning on of power, resetting, and activation of the board 39a including the multi-gigabit transmission interface 38a.

First, initial setting is carried out for each part of the multi-gigabit transmission interface 38a (S11). Here, the multi-gigabit transmission interfaces 38a works as the host side and the multi-gigabit transmission interfaces 38b works as the IO side. In addition, the transmission parameter and the receive parameter have previous values stored in a transmission parameter storage unit 42 and a receive parameter storage unit 52, respectively. Next, a transmission unit 41 detects the multi-gigabit transmission interface 38b which is a receiving side (S12). Next, the multi-gigabit transmission interface 38a carries out communication with the control monitoring board 31 through the multi-gigabit transmission interface 38b in the low-speed transmission mode, thereby the control monitoring by the control monitoring board 31 is carried out (S13). Here, the initial setting of the board including the multi-gigabit transmission interface 38a may be carried out from the control monitoring board 31 by the low-speed transmission mode.

In the present embodiment, if the board including the multi-gigabit transmission interface 38a is the board other than the CPU board 33, the control monitoring is carried out by communication with the control monitoring board 31 through the multi-gigabit transmission path 12, the CPU board 33, and the control monitoring transmission path 11. The multi-gigabit transmission path 12 uses the low-speed transmission mode. On the other hand, if the board 39a including the multi-gigabit transmission interface 38a is the CPU board 33, the control monitoring is carried out by communication with the control monitoring board 31 through the control monitoring transmission path 11, as similar to the conventional art. The control monitoring board 31 and the crossbar switch board 32 or the other boards may be connected by the multi-gigabit transmission interface 38 and the multi-gigabit transmission path 12, and the control monitoring transmission paths 11 and the control monitoring interfaces 13 may be eliminated to make all the boards carry out communication in the low-speed transmission mode.

Next, the transmission parameter control unit 43 and the receive parameter control unit 53 set the transmission parameter and the receive parameter, and store the transmission parameter and the receive parameter in the transmission parameter storage unit 42 and the receive parameter storage unit 52, respectively (S21). Next, the transmission unit 41 and the receiving unit 51 carry out communication in the high transmission mode in accordance with the transmission parameter storage unit 42 and the receive parameter storage unit 52 (S22). This state is a normal high-speed transmission mode. Next, the BER measuring unit 56 determines whether transmission quality meets a predetermined threshold value (S23). Here, the transmission quality is checked by using CRC (Cyclic Redundancy Check) and so on. When the transmission quality does not meet the predetermined threshold value (S23, Y), the operation returns to processing S21, and the transmission parameter and the receive parameter are set again.

On the other hand, in a case the transmission quality meets the predetermined threshold value (S23, N), the transmission unit 41 and the receiving unit 51 determine whether a state in which transmission by the high-speed transmission mode is not carried out continues for a predetermined time (S24). In a case the state in which the transmission is not carried out continues (S24, Y), the transmission unit 41 and the receiving unit 51 carry out communication with the control monitoring board 31 via the multi-gigabit transmission interface 38b in the low-speed transmission mode, thereby the control monitoring by the control monitoring board 31 is carried out (S25), and the operation moves to the processing S26.

On the other hand, in a case that a state in which the transmission is not carried out does not continue (S24, N), the transmission unit 41 and the receiving unit 51 determine whether there is a change in a state of a mounted board when the board is lower than the other boards (S26). In a case that there is a change in the state (S26, Y), the change in the state is notified to a higher board in the low-speed transmission mode (S27), and the operation moves to processing S28. Here, for example, the higher board is the IO control board 34, and the lower boards are the SCSI control board 35, the LAN control board 36, and the USB control board 37 which are connected to the IO control board 34 by the multi-gigabit transmission path 12. On the other hand, in a case that there is not the change in the state (S26, N), the transmission unit 41 and the receiving unit 51 determine whether the communication is terminated or not (S28). In a case the communication is not terminated (S28, N), the operation returns to processing S22, and the communication in the high-speed transmission mode is continuously carried out. When the communication is terminated (S28, Y), this flow is terminated.

In the setting of the transmission parameter and the receive parameter described above, the multi-gigabit transmission interface 38a and the multi-gigabit transmission interface 38b carry out automatic tuning of the transmission parameter and the receive parameter.

Next, operation of the automatic tuning according to the present invention will be described.

Figure 5:
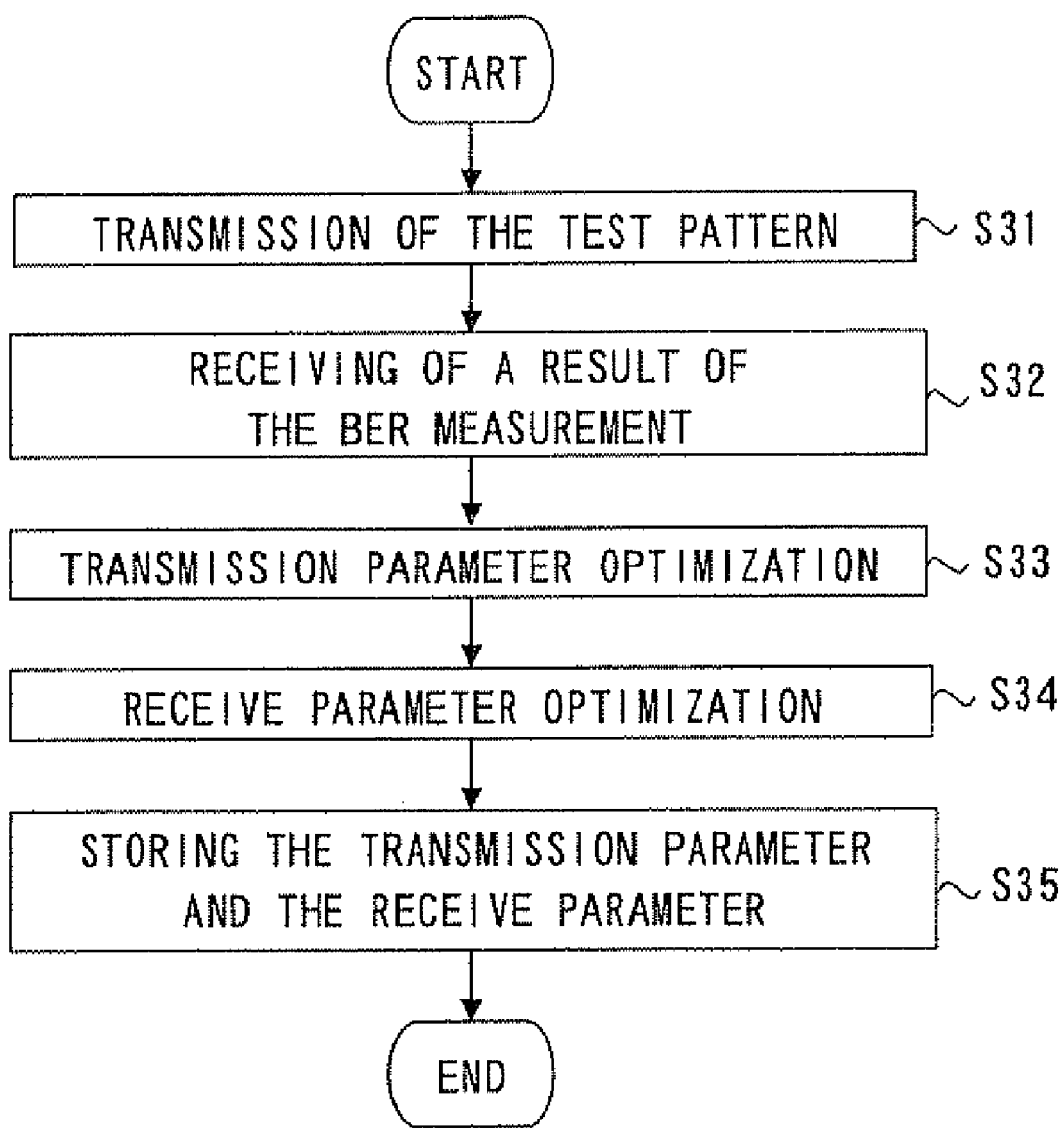
FIG. 5 is a flowchart showing an example of operation of automatic tuning according to the present invention.

FIG. 5 is a flowchart showing an example of the operation of the automatic tuning according to the present invention. Here, the flowchart shows operation of the multi-gigabit transmission interface 38a and the multi-gigabit transmission interface 38b. First, in the multi-gigabit transmission interface 38a, the SW 46 outputs a test pattern for BER measurement input from the test pattern generation unit 44 to the transmission unit 41, thereby the test pattern is sent to the multi-gigabit transmission interface 38b (S31). In the multi-gigabit transmission interface 38b that receives the test pattern, the BER measuring unit 56 measures a BER, and the SW 46 and the transmission unit 41 send a result of the BER measurement to the multi-gigabit transmission interface 38a. Next, in the multi-gigabit transmission interface 38a, the receiving unit 51 receives the result of the BER measurement (S32), and the transmission parameter control unit 43 carries out optimization of the transmission parameter (S33). The receive parameter control unit 53 carries out receive parameter optimization (S34).

After parameter optimization on a transmission side at the multi-gigabit transmission interface 38a is completed, the receive parameter control unit 53 of the multi-gigabit transmission interface 38b carries out the receive parameter optimization (S34). In a similar manner, the parameter optimization on the transmission side at the multi-gigabit transmission interface 38b and the receive parameter optimization at the multi-gigabit transmission interface 38a are carried out. Next, the transmission parameter control unit 43 and the receive parameter control unit 53 send the optimized transmission parameter and receive parameter to the control monitoring board 31 in the low-speed transmission mode, the control monitoring board 31 stores the transmission parameter and the receive parameter (S35), and this flow is terminated.

Next, operation of transmission parameter optimization will be described.

Figure 6:
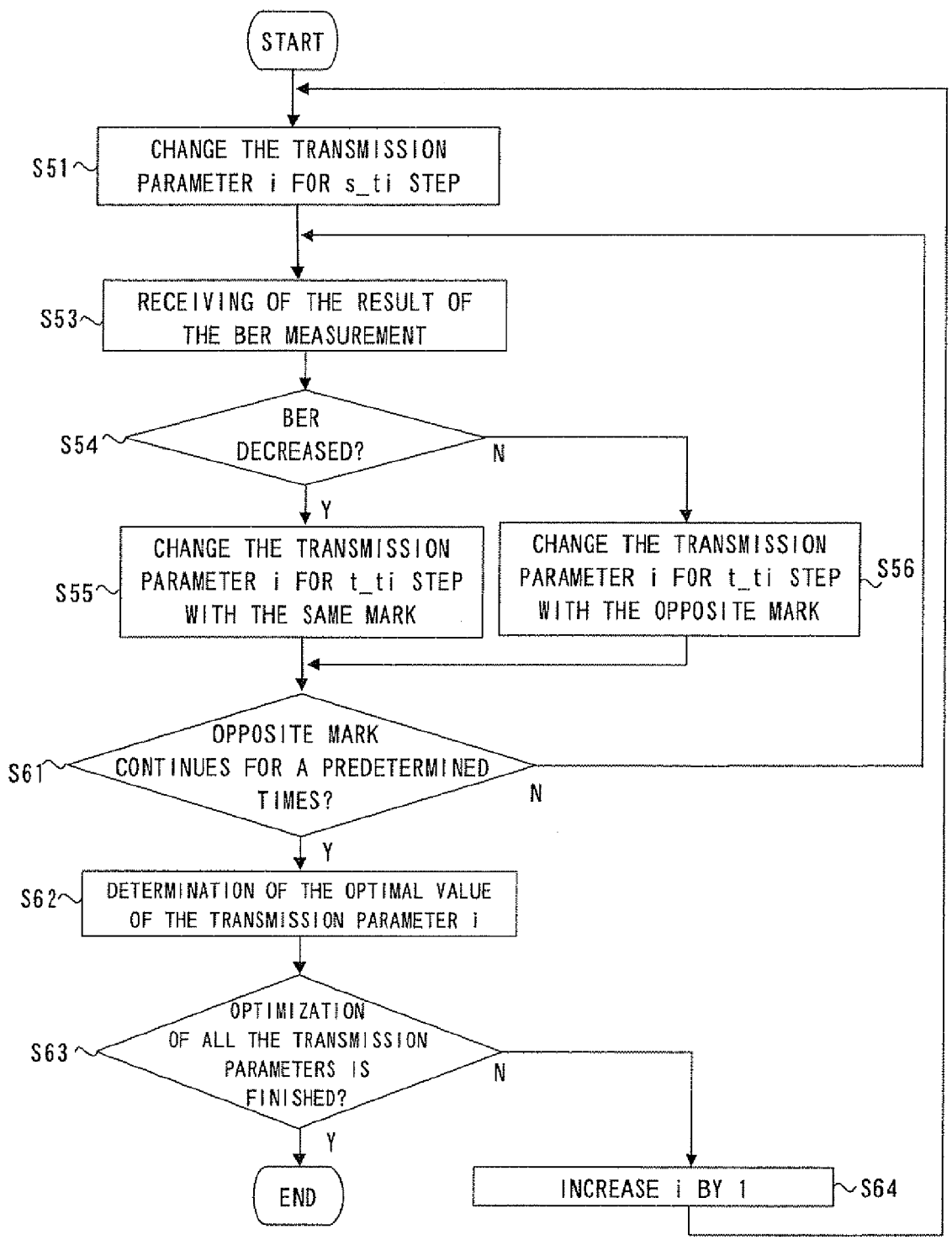
FIG. 6 is a flowchart showing an example of operation of a transmission parameter optimization according to the present invention.

FIG. 6 is a flowchart showing an example of the operation of the transmission parameter optimization according to the present invention. Here, the flowchart shows the operation of the transmission parameter optimization in the multi-gigabit transmission interface 38a. In addition, as a change amount of a transmission parameter i (i is an integer between 1 and the number of the transmission parameters), the change amount in the first time is s_ti step, and an absolute value of the change amount in the second and following times is t_ti step. In addition, an initial value of i is 1. As described above, the test pattern is sent from the multi-gigabit transmission interface 38a to the multi-gigabit transmission interface 38b in the high-speed transmission mode.

First, the transmission parameter control unit 43 of the multi-gigabit transmission interface 38a changes the transmission parameter i for s_ti step (S51). Next, in the multi-gigabit transmission interface 38b, the BER measuring unit 56 measures the BER, and the result of the BER measurement is sent by the modulation unit 45, the SW 46, and the transmission unit 41 to the multi-gigabit transmission interface 38a in the low-speed transmission mode. Next, in the multi-gigabit transmission interface 38a, the receiving unit 51 receives the result of the BER measurement in the low-speed transmission mode (S53), and the transmission parameter control unit 43 compares the result of the BER measurement with a previous result of the BER measurement to determine whether the result of the BER measurement decreases or not (S54). In a case where the result of the BER measurement decreases (S54, Y), the transmission parameter control unit 43 changes the transmission parameter i for t_ti step with a mark same as the previous time (S55), and the operation moves to processing S61. On the other hand, in a case where the result of the BER measurement does not decrease (S54, N), the transmission parameter control unit 43 changes the transmission parameter i for t_ti step with a mark opposite to the previous time (S56), and the operation moves to the processing S61.

Next, the transmission parameter control unit 43 determines whether the change to the opposite mark continues for a predetermined times (S61). In a case the change to the opposite mark does not continue (S61, N), the operation returns to processing S53. On the other hand, if the change to the opposite mark continues (S61, Y), the transmission parameter control unit 43 determines a middle value between values before and after the transmission parameter i changes as an optimal value of the transmission parameter i (S62). Next, the transmission parameter control unit 43 determines whether the optimization of all the transmission parameters has finished, that is, whether i matches with the number of the transmission parameters (S63). In a case where the optimization has not finished (S63, N), the transmission parameter control unit 43 increases i by 1 (S64), and the operation returns to processing S51. If the optimization has finished (S63, Y), this flow is terminated.

Next, operation of the optimization of the receive parameter will be described.

Figure 7:
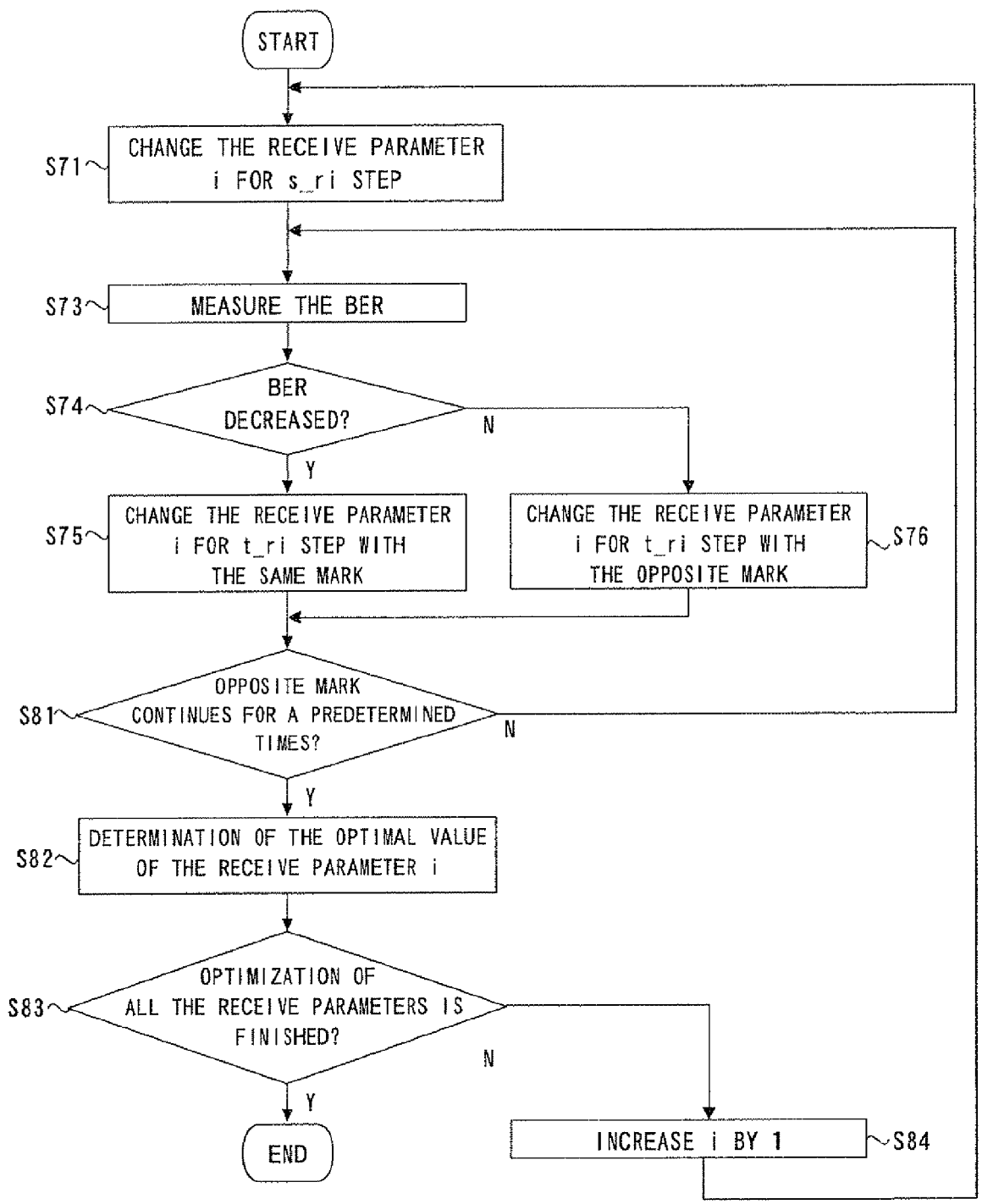
FIG. 7 is a flowchart showing an example of operation of a receive parameter optimization according to the present invention.

FIG. 7 is a flowchart showing an example of the operation of the receive parameter optimization according to the present invention. Here, the operation of the receive parameter optimization in the multi-gigabit transmission interface 38b is shown. In addition, as a change amount of a receive parameter i (i is an integer between 1 and the number of the receive parameters), the change amount in the first time is s_ri step, and an absolute value of the change amount in the second and following times is t_ri step. An initial value of i is 1. As described above, the test pattern is sent from the multi-gigabit transmission interface 38a to the multi-gigabit transmission interface 38b in the high-speed transmission mode.

First, in the multi-gigabit transmission interface 38b, the receive parameter control unit 53 changes the receive parameter i for s_ri step (S71). Next, the BER measuring unit 56 measures the BER from the received test pattern (S73). Next, the receive parameter control unit 53 determines whether the result of the BER measurement has decreased or not by comparing the result of the BER measurement with the previous result of the BER measurement (S74). In a case where the result of the BER measurement has decreased (S74, Y), the receive parameter control unit 53 changes the receive parameter i for t_ri step with a mark same as a previous one (S75), and the operation moves to processing S81. On the other hand, if the result of the BER measurement has not decreased (S74, N), the receive parameter control unit 53 changes the receive parameter i for t_ri step with a mark opposite to the previous one (S76), and the operation moves to processing S81.

Next, the receive parameter control unit 53 determines whether the change to the opposite mark continues for a predetermined times (S81). In a case where the change to the opposite mark does not continue (S81, N), the operation returns to processing S73. On the other hand, if the opposite mark continues (S81, Y), the receive parameter control unit 53 determines a middle value between values before and after the receive parameter i changes as an optimal value of the receive parameter i (S82). Next, the receive parameter control unit 53 determines whether the optimization of all the receive parameters has finished, that is, whether i matches with the number of the receive parameters (S83). In a case the optimization has not finished (S83, N), the receive parameter control unit 53 increases i by 1 (S84), and the operation returns to processing S71. If the optimization has finished (S83, Y), this flow is terminated.

As described above, the automatic tuning is carried out in the setting of the transmission parameter and the receive parameter, thereby the transmission parameter and the receive parameter can be made close to a value at which the BER becomes minimum. In the present embodiment, it has been described that the multi-gigabit transmission interface 38 carries out the automatic tuning. However, the setting of the transmission parameter and the receive parameter of the multi-gigabit transmission interface 38 may be carried out from outside. In a case where the transmission parameter and the receive parameter do not converge in the transmission parameter optimization and the receive parameter optimization, the multi-gigabit transmission interface 38 may have the transmission parameter and the receive parameter stored in the control monitoring board 11 transmitted thereto by carrying out communication with the control monitoring board 11 in the low-speed transmission mode, so that the transmission parameter and the receive parameter are stored in the transmission parameter storage unit 42 and the receive parameter storage unit 52.

Next, operation of the transmission in the low-speed transmission mode and the high-speed transmission mode will be described.

Figure 8:
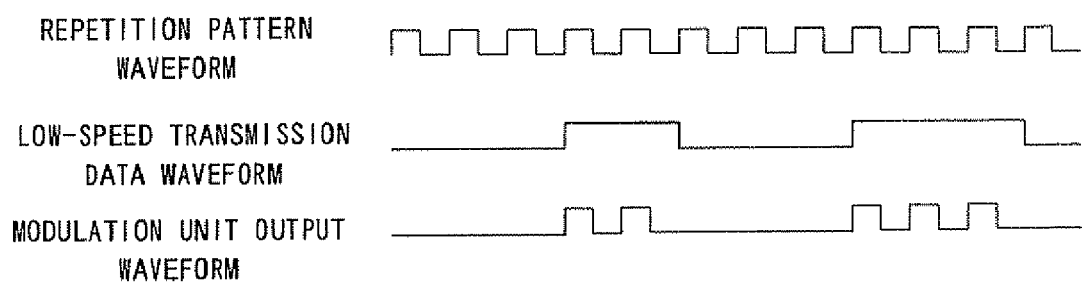
FIG. 8 is a waveform representing an example of transmission operation in a low-speed transmission mode according to the present invention.

In the low-speed transmission mode, the modulation unit 45 generates a repeated pattern of "01" in the transmission speed of the high-speed transmission mode, modulates input low-speed data by the repeated pattern, and outputs the modulated data to the SW 46. The SW 46 outputs the input from the modulation unit 45 to the transmission unit 41. The transmission unit 41 sends the input from the SW 46 in a state that the input is adjusted in accordance with the transmission parameter, and outputs the input to the multi-gigabit transmission path 12. FIG. 8 is a waveform representing an example of operation of the transmission in the low-speed transmission mode according to the present invention. The waveforms represent a repeated pattern waveform, a low-speed transmission data waveform, and a modulation unit output waveform, in the order from the top waveform. In the high-speed transmission mode, the SW 46 outputs the high-speed transmission data input from the board 39 to the transmission unit 41. The transmission unit 41 transmits the input from the SW 46 in a state where the input is adjusted in accordance with the transmission parameter, and outputs the input to the multi-gigabit transmission path 12.

Next, operation of receiving in the low-speed transmission mode and the high-speed transmission mode will be described.

Figure 9:
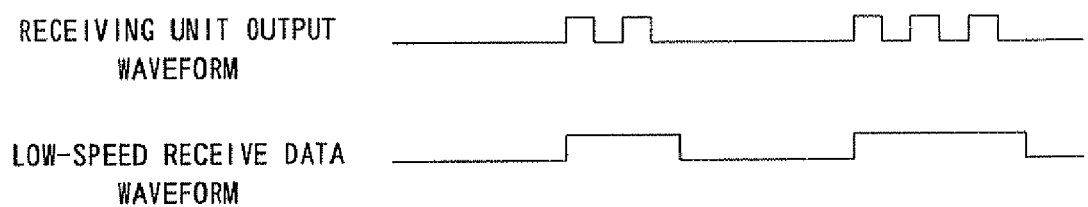
FIG. 9 is a waveform representing an example of receiving operation in a low-speed transmission mode according to the present invention.

In the low-speed transmission mode, the receiving unit 51 receives a waveform received from the multi-gigabit transmission path 12 in a state adjusted in accordance with the receive parameter and outputs the waveform to the demodulation unit 55. The demodulation unit 55 allows only high-speed data of repetition of "01" to pass by a BPF (band path filter), and a comparator determines whether or not a level of a signal passing through the BPF has exceeded a predetermined value. Consequently, a result of the determination is output to the board 39 and the transmission parameter control unit 43 as low-speed receive data. FIG. 9 shows waveforms representing an example of the receiving in the low-speed transmission mode according to the present invention. From the top, the waveforms represent a receiving unit output waveform and a demodulation unit output waveform. In addition, in the high-speed transmission mode, the receiving unit 51 receives a waveform received from the multi-gigabit transmission path 12 in a state that the waveform is adjusted by the receive parameter, and outputs the waveform to the board 39 as high-speed receive data.

Here, the repetition pattern of "01" is used. However, a repetition pattern of "0011", a repetition pattern of "000111", a repetition pattern of "00001111", and so on may be used.

By the operation of the low-speed transmission mode described above, the low-speed data which does not require optimization of the transmission parameter and the receive parameter can be transmitted by using the multi-gigabit transmission interface 38 and the multi-gigabit transmission path 12, and the low-speed data can be used for the control monitoring and parameter setting.

The information transmission device corresponds to the multi-gigabit transmission interface in the embodiment. In addition, the control monitoring unit corresponds to the control monitoring board in the embodiment. The transmission control unit corresponds to the transmission parameter control unit and the transmission parameter storage unit in the embodiment. The receive control unit corresponds to the receive parameter control unit and the receive parameter storage unit in the embodiment. The transmission unit corresponds to the modulation unit, the SW, the transmission unit, and the test pattern generation unit in the embodiment. The receiving unit corresponds to the receiving unit, the demodulation unit, the BER measuring unit, and the test pattern generation unit in the embodiment.

INDUSTRIAL APPLICABILITY

As described above, by reducing the number of the control monitoring interfaces and the control monitoring transmission paths, wiring space and circuit components in the information processing devices can be significantly reduced, and congestion between transmission paths can be reduced. By carrying out the automatic tuning of the transmission parameter and the receive parameter, high quality transmission can be achieved even when a condition of the transmission path changes.

The invention claimed is:
1. An information transmission device that is included in components and carries out communication between the components in an information processing device including a control monitoring unit that controls and monitors the components, comprising:
- a transmission control unit that stores a transmission parameter including one or more of an output amplitude, emphasis strength, a driving impedance, selection of AC/DC coupling, and a transmission speed;
- a transmission unit that has transmission data input thereto in a first transmission speed or a second transmission speed having a transmission speed lower than the first transmission speed, modulates the transmission data in the second transmission speed by a pattern of the first transmission speed when the transmission data in the second transmission speed is input, adjusts the transmission data in the first or second transmission speed according to the transmission parameter, and sends the transmission data as respective first or second transmission signal to the information transmission device which is a connection destination via a transmission path;
- a receive control unit that stores a receive parameter including one or more of an equalizer coefficient and a gain; and
- a receiving unit that adjusts a received first or second transmission signal received from the information transmission device which is a connection destination in accordance with the receive parameter, demodulates the received second transmission signal in the second transmission speed modulated by the pattern of the first transmission speed, and outputs the received first or second transmission signal in the respective first transmission speed or the second transmission speed as receive data,
- thereby the transmission data in the first and second transmission speeds are transmitted using the same transmission path, wherein
- the transmission unit sends a test pattern to the information transmission device which is a connection destination in the first transmission speed,
- when the information transmission device which is a connection destination receives the test pattern, an error ratio of the test pattern is measured, and the information transmission device sends a measurement result of the error ratio in the second transmission speed, the receiving unit receives the measurement result of the error ratio, and
- the transmission control unit changes the transmission parameter based on the measurement result of the error ratio.

2. The information transmission device according to claim 1, wherein
the transmission unit and the receiving unit use the second transmission speed with respect to data of the control and monitoring.

3. The information transmission device according to claim 2, wherein
the transmission unit and the receiving unit carry out communication in the second transmission speed first, and after the communication is terminated, the transmission unit and the receiving unit carry out communication in the first transmission speed, in a case where any of turning on of power, resetting, and activation is carried out in the component including the information transmission device.

4. The information transmission device according to claim 1, wherein
the receiving unit receives a test pattern sent by the information transmission device which is a connection destination in the first transmission speed, and measures an error ratio of the received test pattern,
the receive control unit changes the receive parameter based on a measurement result of the error ratio, and
the transmission unit sends the measurement result of the error ratio to the information transmission device which is a connection destination in the second transmission speed.

5. An information transmission method that carries out communication between components in an information processing device including a control monitoring unit that controls and monitors the components, comprising:
- a transmission control step that stores a transmission parameter including one or more of an output amplitude, emphasis strength, a driving impedance, selection of AC/DC coupling, and a transmission speed;
- a transmission step that has transmission data input thereto in a first transmission speed or a second transmission speed having a transmission speed lower than the first transmission speed, modulates the transmission data in the second transmission speed by a pattern of the first transmission speed when the transmission data in the second transmission speed is input, adjusts the transmission data in the first or second transmission speed according to the transmission parameter, and sends the transmission data as respective first or second transmission signal to the component which is a connection destination via a transmission path;
- a receiving control step that stores a receive parameter including one or more of an equalizer coefficient and a gain; and
- a receiving step that adjusts a received first or second transmission signal received from the component which is a connection destination in accordance with the receive parameter, demodulates the received second transmission signal in the second transmission speed modulated by the pattern of the first transmission speed, and outputs the received first or second transmission signal in the respective first transmission speed or the second transmission speed as receive data,
- thereby the transmission data in the first and second transmission speeds are transmitted using the same transmission path, wherein
- the transmission step sends a test pattern to the component which is a connection destination in the first transmission speed,
- when the component which is a connection destination receives the test pattern, an error ratio of the test pattern is measured, and a measurement result of the error ratio is transmitted in the second transmission speed, the receiving step receives the measurement result of the error ratio, and
- the transmission control step changes the transmission parameter based on the measurement result of the error ratio.

6. The information transmission method according to claim 5, wherein
the transmission step and the receiving step use the second transmission speed with respect to data of the control and monitoring.

7. The information transmission method according to claim 6, wherein
the transmission step and the receiving step carry out communication in the second transmission speed first, and after the communication is terminated, the transmission step and the receiving step carry out communication in the first transmission speed, in a case where any of turning on of power, resetting, and activation is carried out in the component.

8. The information transmission method according to claim 5, wherein the receiving step receives a test pattern sent by the component which is a connection destination in the first transmission speed, and measures an error ratio of the received test pattern, the receiving control step changes the receive parameter based on a measurement result of the error ratio, and the transmission step sends the measurement result of the error ratio to the component which is a connection destination in the second transmission speed.

* * * * *